United States Patent [19]

Takatori et al.

[11] Patent Number: 5,195,171

[45] Date of Patent: Mar. 16, 1993

[54] DATA PROCESSING SYSTEM

[75] Inventors: Sunao Takatori; Ryohei Kumagai; Makoto Yamamoto; Koji Matsumoto, all of Tokyo, Japan

[73] Assignee: Yozan, Inc., Tokyo, Japan

[21] Appl. No.: 767,565

[22] Filed: Sep. 30, 1991

Related U.S. Application Data

[63] Continuation of Ser. No. 504,809, Apr. 5, 1990, abandoned.

[30] Foreign Application Priority Data

Apr. 5, 1989 [JP] Japan .................................. 1-84783
Apr. 28, 1989 [JP] Japan ................................. 1-107150

[51] Int. Cl.⁵ .......................................... G06F 15/18
[52] U.S. Cl. .................................... 395/24; 395/27
[58] Field of Search ................ 364/513; 395/21, 23, 395/24, 27

[56] References Cited

U.S. PATENT DOCUMENTS

| | | | |
|---|---|---|---|
| 3,287,649 | 9/1963 | Rosenblatt | 364/513 |
| 3,496,382 | 5/1967 | Hendrix | 364/513 |
| 3,602,888 | 12/1968 | Nishiyama | 364/513 |
| 4,897,811 | 1/1990 | Scofield | 364/513 |
| 4,914,603 | 4/1990 | Wood | 364/513 |
| 4,918,618 | 4/1990 | Tomlinson, Jr. | 364/807 |
| 4,941,122 | 7/1990 | Weideman | 364/807 |
| 4,951,239 | 8/1990 | Andes et al. | 364/513 |

OTHER PUBLICATIONS

"Neural Computing, Theory and Practice", Philip D. Wasserman, 1989.
"Parallel Distributed Processing", David E. Rumelhart and James L. McClelland, vol. 1, MIT press, Cambridge, Mass.
"An Introduction to Computing with Neural Nets", Richard P. Lippmann, IEEE ASSP Magazine, Apr. 1987.
"Neural Network Models for Pattern Recognition and Assoicative Memory", Gail A. Carpenter, Neural Networks, vol. 2, pp. 243-257, 1989.

Primary Examiner—Allen R. MacDonald
Assistant Examiner—George Davis
Attorney, Agent, or Firm—Cushman, Darby & Cushman

[57] ABSTRACT

A data processing system having a neural layer which comprises a neuron for comparing a sum of inputted data weighted by a weight with a threshold so as to output an output according to a result of the comparing, characterized in that the neural layer comprises as many neural layers as a difference between an abstraction degree of input and output data of the data processing system.

3 Claims, 16 Drawing Sheets

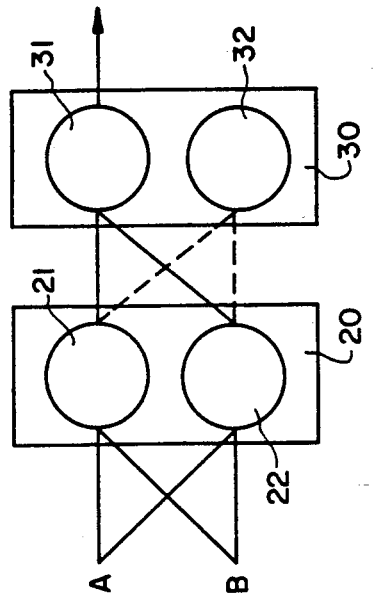
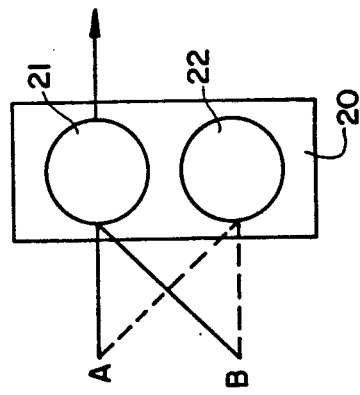
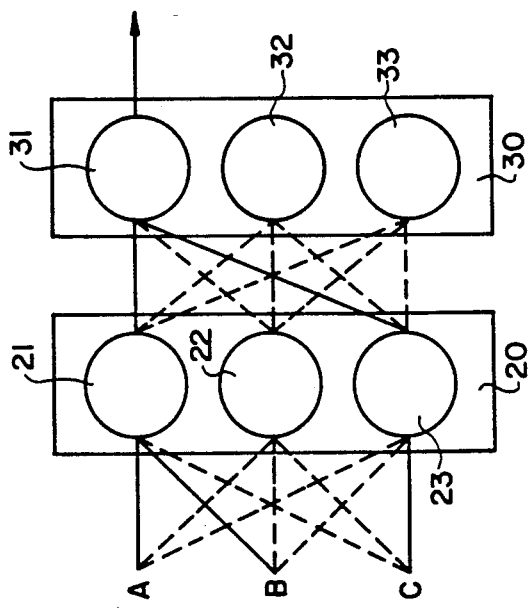

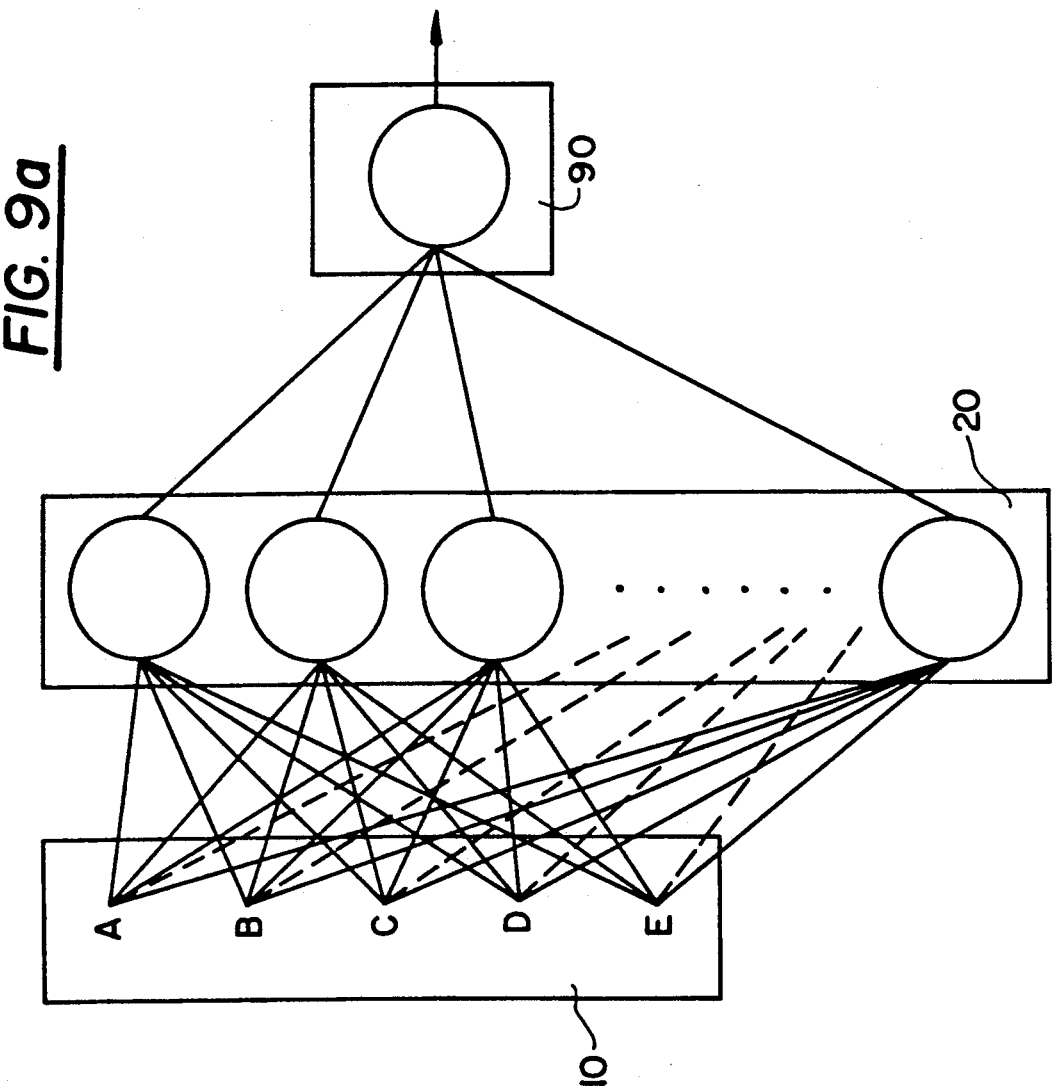

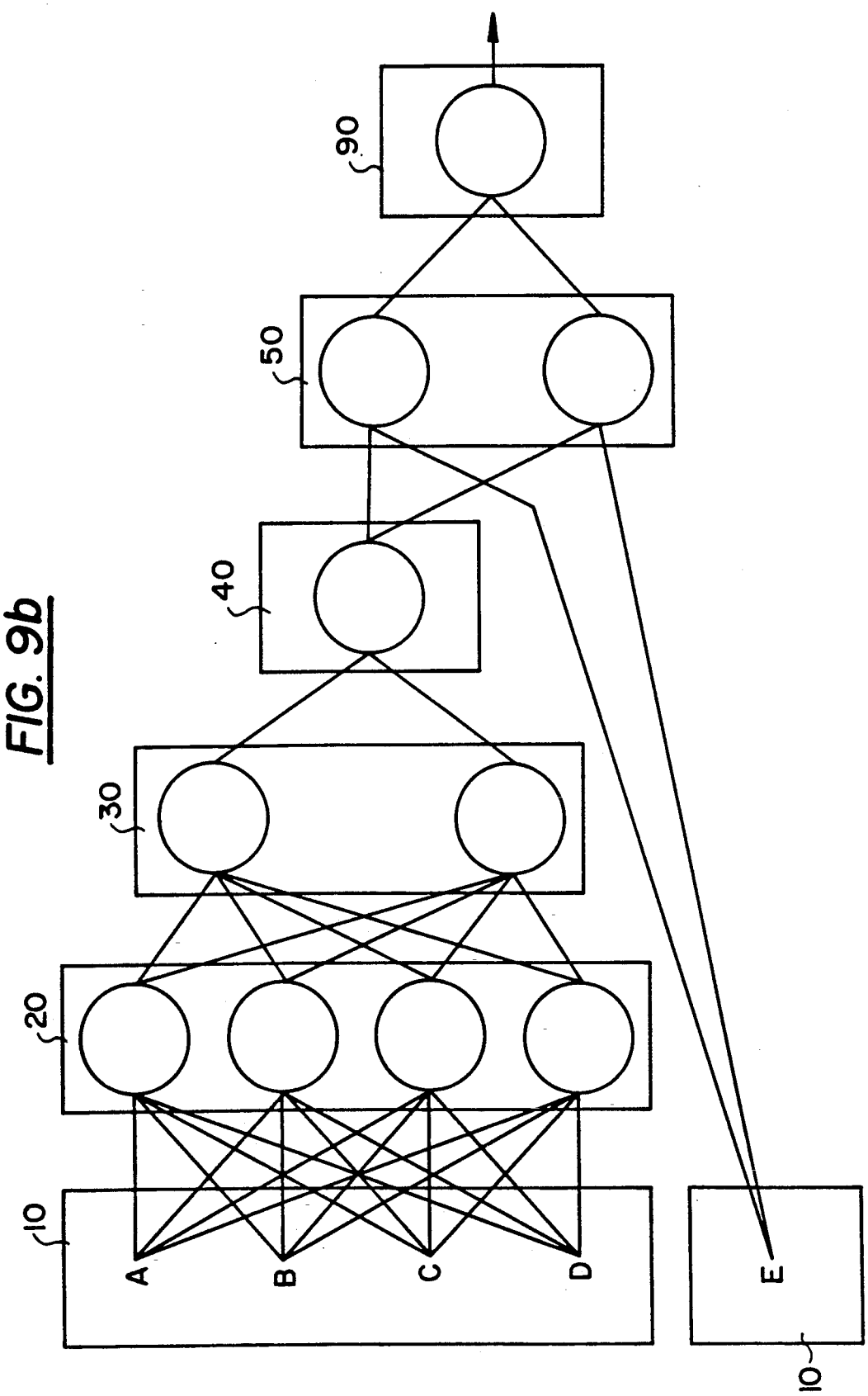

FIG. 10a
FIG. 10b1
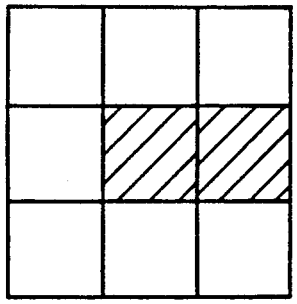
FIG. 10b2
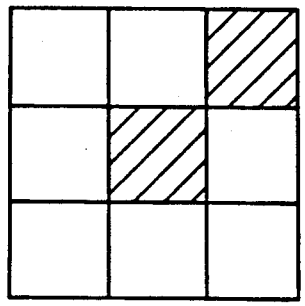
FIG. 10b3
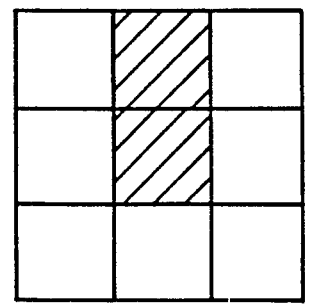
FIG. 10b4
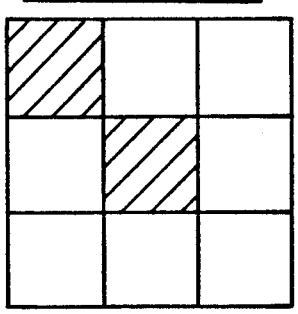
FIG. 10b5
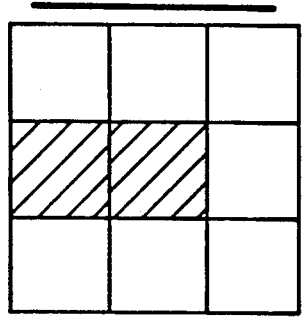
FIG. 10b6
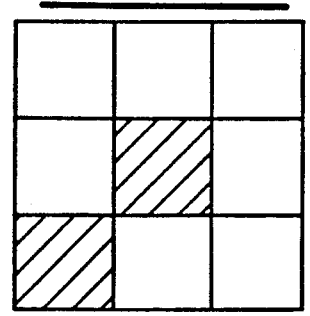
FIG. 10b7
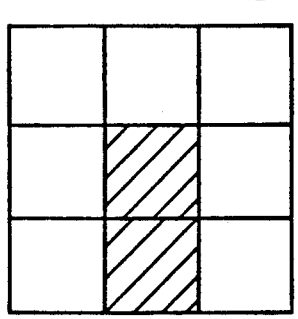
FIG. 10b8
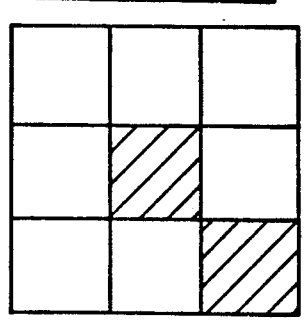

DATA PROCESSING SYSTEM

This is a continuation of application Ser. No. 07/504,809, filed on Apr. 5, 1990, now abandoned.

BACKGROUND OF THE INVENTION

1. Field of the Invention

The present invention relates to a data processing system based on the concept of a neural network.

2. Prior Art

The neural network in this kind of data processing system consists of layers of neuron models (neurons) arranged in parallel, as shown in FIG. 1. In a neuron 1, input data DI1, DI2, DI3 . . . DIn are multiplied by weights W1, W2, W3, . . . Wn. Output data DO is a Comparison result between the weighted sum of inputs and a threshold "$\theta$". There are various manners in which to compare them. For example, output data DO becomes "1" when the weighted sum is equal to or more than the threshold "$\theta$", and the output data DO becomes "0" when the weighted sum is less than the threshold "$\theta$".

For the neural network in FIG. 2, 2 combinations can be expressed by patterns of n bits. Therefore, neurons 1 are necessary for a neural network to judge the input data. 16 neurons are necessary for a bit pattern of 4 bits. The number of neurons doubles for every additional bit.

When a neural network is constructed from many layers, the number of neurons increases in response to the increase in layers ("neural layers" hereinafter), and the number of input lines to be connected to neurons, that is, the number of synapses, also increases.

A neural layer is constructed by arranging such neurons in parallel, and layers are connected in series to form a network. There has been no established theory of how to select the number of neurons or layers. If pressed to give an example, one can perform trials when deciding the number of layers to be 3 or deciding the number of neurons to be equal to the numbers of input data, according to Perceptron which is suggested by Rosenblatt. Therefore, there has never been a clear relationship between the data processing to be performed in a neural network and the capacity or construction of the neural network. Accordingly, it has been unknown if a constructed neural network will actually achieve the expected performance until an experimental result is obtained.

SUMMARY OF THE INVENTION

The present invention relates to a neural network data processing system.

As the number of neurons or synapses increases, the numbers of weights and thresholds to be stored in a neural network also increases. Accordingly, a large capacity of memory is necessary. Moreover, since many multiplications of input data by weights and comparisons of thresholds are necessary, computation speed becomes slow.

The present invention provides a data processing system, with a limited number of neurons and synapses. A data processing system according to the present invention has a characteristic that the number of neural layers corresponds to a difference between an abstraction degree of output data and that of input data. The higher the abstraction degree, the greater the number of neural layers are determined.

A data processing system according to the present invention has another characteristic in that data of higher abstraction degree is directly input to later stage neural layers.

The higher the abstraction degree, the greater the number of neural layers are determined.

The number of neurons and synapses are limited by the above construction. Consequently, the capacity of necessary memory and processing time are saved.

BRIEF DESCRIPTION OF THE DRAWINGS

FIG. 3(a) shows the first embodiment of the present invention.

FIG. 3(b) shows the second embodiment of the present invention.

FIG. 3(c) shows the third embodiment of the present invention.

FIG. 9(a) shows the eighth embodiment.

FIG. 9(b) shows the ninth embodiment.

FIG. 10(a) shows $3 \times 3$ convolution of an image.

FIG. 10(b) shows patterns of $3 \times 3$ convolution with end point as center pixel.

PREFERRED EMBODIMENT OF THE PRESENT INVENTION

Figure 1:
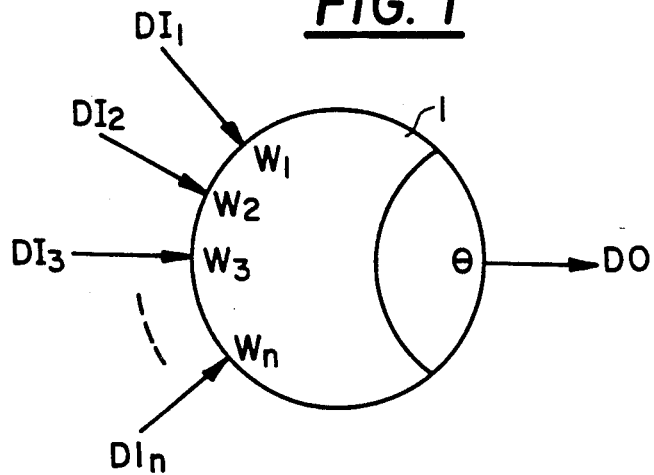
FIG. 1 shows a well-known neural model.
Figure 2:
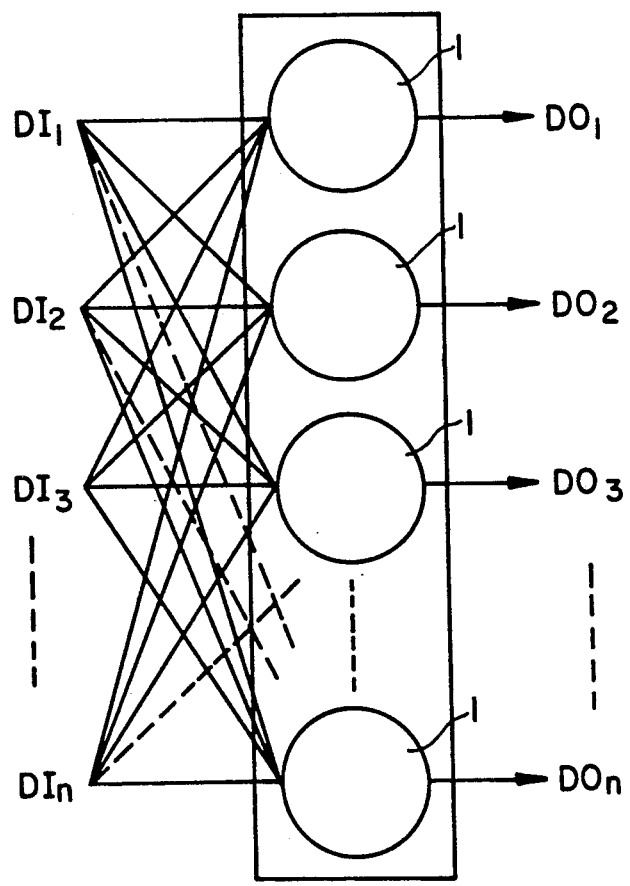
FIG. 2 shows a well-known neural network of one layer.

Hereinafter, embodiments of data processing systems according to the present invention are described with reference to the attached drawings. Processing in a neural network is complex. Some simple embodiments are described first for any easy understanding of the basic concept of the present invention.

FIG. 3(a) shows a first network illustrating the present invention for processing a logic computation of A+B (after proper learning).

The data processing system comprises one neural layer 20 having the same number of neurons as the number of inputs, that is 2 neurons 21 and 22. Data A and B are input to the neurons 21 and 22 respectively. Neurons 21 and 22 have input lines for which weights W1s and thresholds are given. The weight W1 changes due to learning so that neurons adapt to perform an expected process. In this embodiment, only one neuron 1 performs the logic computation of (A+B) and the other neuron 22 does not work substantially. When W1=1, W2=1 and $\theta=1$ in neuron 21, Neuron 21 outputs a "1" when $$AW1+BW2 \geq 1 \quad (1)$$

On the other hand, when W3=0, W4=0 and $\theta=1$ in neuron 22, the formula below is always true.

$$AW3+BW4<1 \quad (2)$$

It means that the value of AW3+BW4<1 does not exceed the threshold $\theta$ and the output from neuron 22 is "0".

When at least one of data A and B is "1", neuron 21 outputs a "1" and the data processing system executes the logic computation (A+B).

FIG. 3(b) shows a second network illustrating the present invention. The data processing system executes a logic computation of (A⊕B). ⊕ designates "exclusive-or logical addition". The data processing system comprises 2 neural layers 20 and 30. Neurons 21 and 22 are included in the first neural layer 20; neurons 31 and 32 are included in the second-final-layer 30. Data A and B are input to neurons 21 and 22.

Logic computation of (A⊕B) can be expanded as ($\overline{AB}$&$A\overline{B}$). Neuron 21 performs the processing of ($\overline{A}B$) and neuron 22 performs the processing of ($A\overline{B}$) in neural layer 20. Here, W1=−1, W2=1 and $\theta=1$ in neuron 21. Neuron 21 outputs a "1" when the following formula is satisfied:

$$AW1+BW2=1 \quad (3)$$

On the other hand, W3=1, @4=1−1 and $\theta=1$ in neuron 22. Neuron 22 outputs an output data "2" when the following is satisfied.

$$AW3+BW4 \geq 1 \quad (4)$$

Neuron 31 in neural layer 30 executes the processing of ($\overline{A}B+A\overline{B}$). When W5=1, W6=1, $\theta=1$, the output of neuron 21 is Y1 and that of neuron 22 is Y2. Neuron 21 outputs a "1" when the following formula is satisfied:

$$Y1W5+Y2W6>-1 \quad (5)$$

Neuron 32 does not work substantially. Neuron 31 outputs a "1" when data A and B are different form each other, and outputs "0" when both of them are "1" or "0". The data processing system of this embodiment executes the logic computation of (A⊕B).

FIG. 3(c) shows a third network illustrating the present invention. The data processing system performs a logic computation of (A+B)C after learning. It comprises two neural layers 20 and 30. The first neural layer 20 includes neurons 21, 22 and 23 and the next neural layer 30 includes neurons 31, 32 and 33. Data A, B and C are input to neurons 31, 32 and 33. Data A, B and C are input to neurons 21, 22, and 23, in the first neural layer 20.

Neuron 21 processes (A+B), neuron 22 does not work substantially and neuron 23 outputs an input data C when W1=1, W2=1, W3=0 and $\theta=1$ in neuron 21.

Neuron 21 outputs the output data "1" when the following formula is satisfied.

$$AW1+BW2+CW3 \geq 1 \quad (6)$$

Neuron 22 does not work substantially and has weights W4, W5 and W6 settled at 0 and threshold $\theta$ settled at 1. Neuron 23 outputs a "1" when the following formula is satisfied.

$$AW7+BW8+CW0 \geq 1 \quad (7)$$

Otherwise, it outputs a data "0".

Neuron 31 in neural layer 30 processes (A+B)C according to the output of neurons 21 and 23 in neural layer 20. For neuron 31, W11=1, W12=0, W13=1, $\theta=2$ and the output of neuron 23 is Y3. Neuron 31 outputs a "1" when the following formula is satisfied.

$$Y1W11+Y2W12+Y3W13 \geq 2 \quad (8)$$

Neurons 32 and 33 do not work substantially.

Neuron 31 outputs a "1" when at least one of data A and B is "1" and data C is "1". The data processing system of this embodiment execute a logic computation (A+B)C.

Here, the basis concept of the present invention is described. Data A and B in the first network are connected by the a logic operator of "+(OR)". The logic computation of (A+B) is executed in a neural layer 20.

Data A and B in the second embodiment are connected by "⊕ (EX-OR)". The logic computation (A⊕B) is expanded as ($\overline{A}B+A\overline{B}$). $\overline{A}B$ and $A\overline{B}$ are executed in the first neural layer 20, that is, a logic computation of an operator "×(AND)". Next, ($\overline{A}B+A\overline{B}$) is executed in the second neural layer 30. The logic computation of the second embodiment is executed through 2 neural layers.

Data A and B in the third embodiment are connected by an operator "+(OR)": this logic computation is executed in the first neural layer 20. The result of the logic computation is connected to data C by an operator "×(AND)". The logic computation is (A+B)C, which is executed in the second neural layer 30. The logic computation of the third embodiment is executed through 2 neural layers.

Logical function of data processing system is expressed by the logic operators "AND" and "OR", the number of neural layers is increased according to the number of logic operators of the construction of logic computation.

It is assumed that how far a data is abstracted can be defined, and here, it is defined as "abstraction degree". It is also assumed that the processing of a neuron is expressed only by the following formula.

$$\Sigma W_i A_i - \theta \quad (9)$$

where, Wi is a weight, .Ai is an input data nd $\theta$ is threshold. It can be defined that an output of a neuron is higher in abstraction degree than that of the input data. It is also defined that data connected by an operator with each other have the same abstraction degree.

From these definitions, assuming data A and B of are of abstraction degree of "0", the output from the first layer to the neurons in the second neural layer 30 can be defined as having an abstraction degree of "1". The calculation result of ($\overline{AB}+A\overline{B}$) in the second neural layer 30 can be defined as having an abstraction degree of "2". Since the last output has a degree of 2, the logic computation (A⊕B) needs 2 neural layers. The total number of layers of a neural network can be determined by subtracting the abstraction degree of input data from the degree of the final output. That is to say, the number of neural layers is the difference between the abstraction degrees of the input data and the output data.

This is the basic concept of the present invention. The degree indicates how data is abstracted. The abstraction can be evaluated from characteristics of the data. For example, pixel data is of zero degree; end point data, data of number of holes and Euler number are higher in degree than pixel data. For obtaining end point data from pixel data, the number of neural layers is determined by subtracting the abstraction degree of pixel data from the abstraction degree of end point data. Embodiments for processing end points will be described later with reference to FIG. 10 and FIG. 11.

Figure 4A:
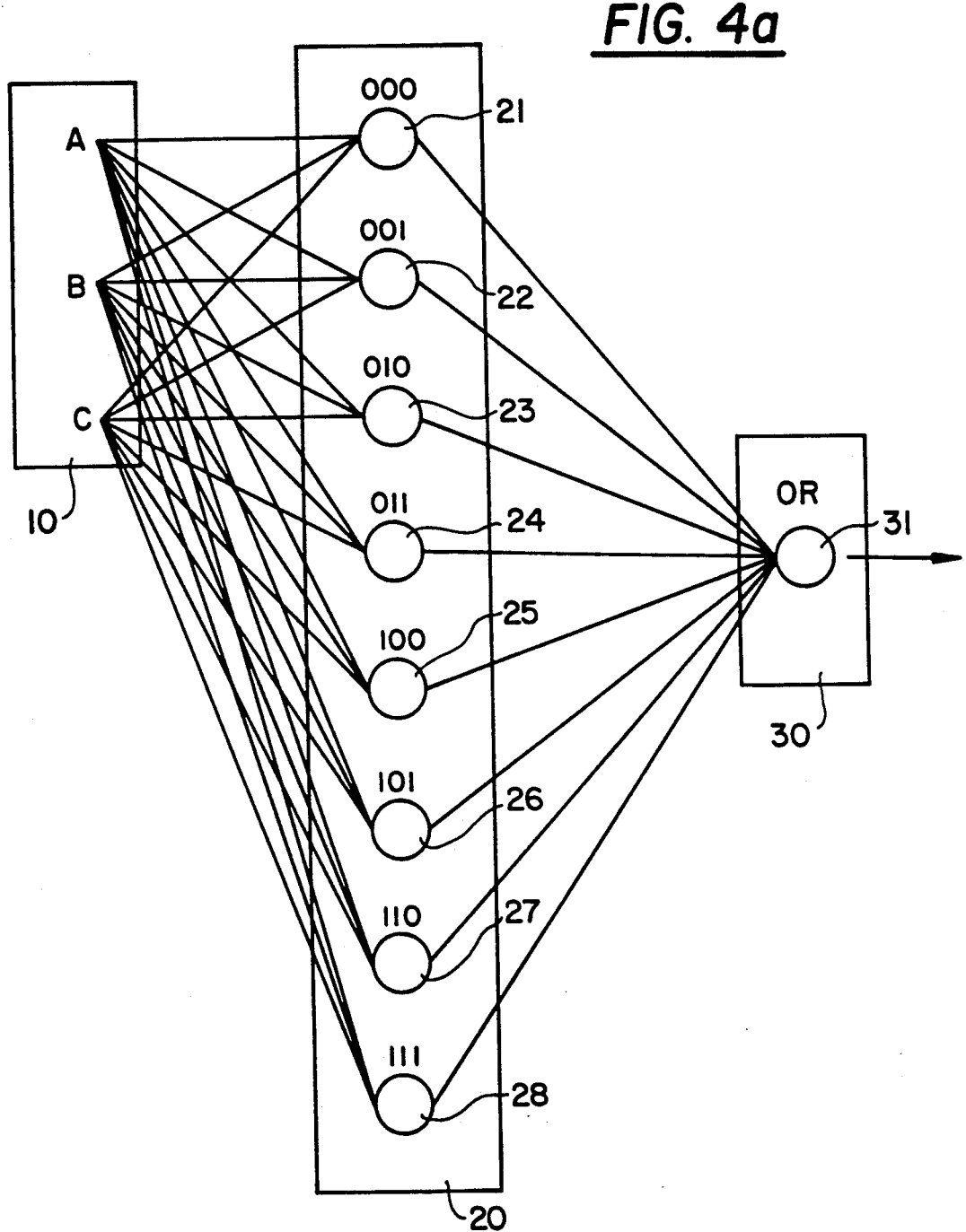
FIG. 4(a) shows a neural network to be compared with the following embodiment.

FIG. 4(a), (b) and (c) show a data processing system which performs the logic computation of equation (10).

$$A \times (B+C) \quad (10)$$

FIG. 4(a) shows a similar construction as described in PRIOR ART. Eight neurons from 21 to 28 are arranged in one neural layer 20. The number of neurons is same as the number of combinations of A, B and C in the data group 10, that is, $2^3$.

A neuron 31 computes the logical OR (logic sum) of the outputs from neurons 21 to 28 of the first neural layer 20. The neuron 30 is positioned in the second neural layer 30. Patterns, such as "000", are generated by neurons A, B and C. These neurons output "1" when bit patterns shown for each neuron are received. The number of neurons is 9 and the number of synapses is 32: neurons and synapses work inefficiently and required memory capacity is large. Lots of processing time is necessary, as well.

Figure 4B:
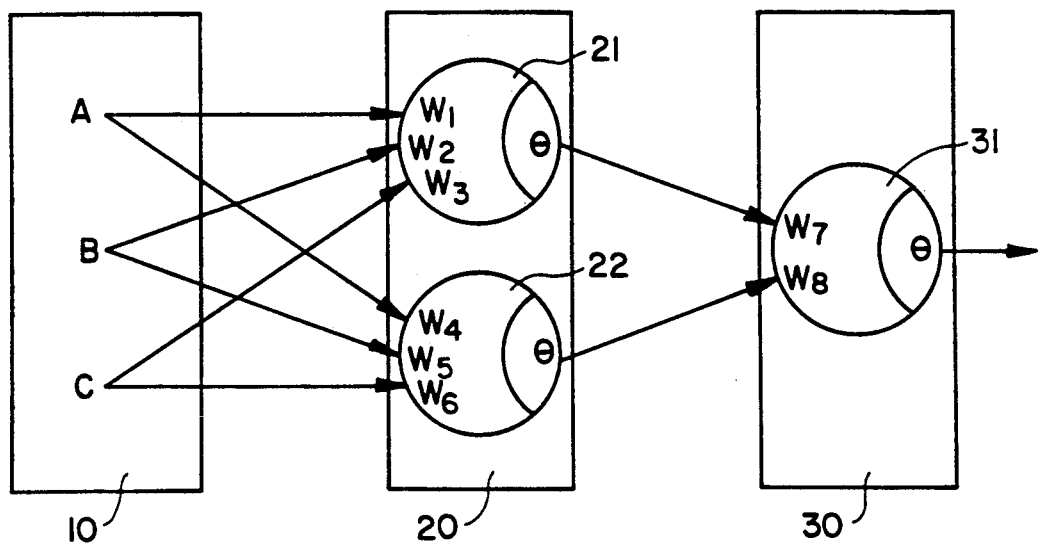
FIG. 4(b) shows another comparative neural network.

FIG. 4(b) corresponds to an expanded formula (11) for simplifying the computation of formula (1).

$$(A \times B) + (A \times C) \quad (11)$$

The first neural layer 20 comprises a neuron 21 for processing the computation of A×B and a neuron 22 for processing the computation of A×C. The second neural layer 30 comprises neuron 31 for calculating the logical OR of outputs of neurons 21 and 22.

In neuron 21, weights from W1 to W3, corresponding to data A, B and C are W1=1, W2=1 and W3=0. The threshold equals θ2. The output is "1" when formula (12) is satisfied.

$$AW1+BW2+CW3 \geq 2 \quad (12)$$

For neuron 31, W4=1, W5=0, W6=1 and θ=2 in neuron 22, and W7=1, W8=1 and θ=1.

In the data processing system of FIG. 4(b), the number of neurons is 3 and the number of synapses is 8. The neurons and synapses work more efficiently than in the data processing system of FIG. 4(a).

Figure 4C:
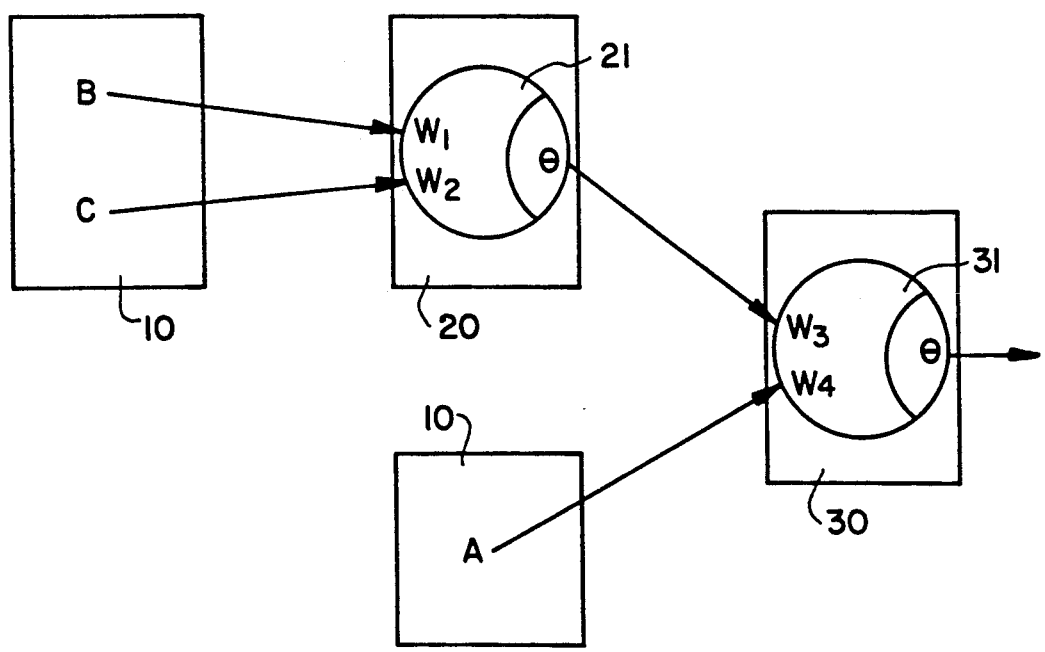
FIG. 4(c) shows the fourth embodiment of the present invention.

FIG. 4(c) shows an embodiment of the present invention comprising a first neural layer 20 and a second neural layer 30. Data B and C are input to the first neural layer 20. Data A is input directly to the second neural layer 30. A neuron 21 for computing (B+C) is in the first neural layer 20. A neuron 31 for computing A×(B+C) is in the second neural layer 30. Neuron 21 outputs a "1" when W1=1, W2=1, θ=1 and formula (13) is satisfied.

$$BW1+CW2 \geq 1 \quad (13)$$

Neuron 31 outputs a "1" when W3=1, W4=1, θ=2 and formula (14) is satisfied, where Y1 is the output of neuron 21.

$$Y1W3+AW4 \geq 2 \quad (14)$$

There are 2 neurons and 4 synapses. The neurons and synapses work more efficiently than those in FIG. 4(b).

A feature of the present invention is described below. Neurons and synapses work most efficiently by grouping data by abstracting degree and by inputting data of degree to the corresponding neural layer.

For example, data B and C in formula (10) are combined together by an operator "+ (OR)". The degree of data B and C are the same. The computation result and data A are combined together by an operator "× (AND)". Data B and C should not be evaluated on the same level with A. If they are evaluated as the same level, the performance of the network becomes inefficient as in FIG. 4(a) and (b).

Data A has a higher degree than B and C. Here, the degree of data A is "1" when those of data B and C are "0".

Considering the relationship between the degrees of the data and of the neural layer, only 0-degree data is input in neural layer 20 and only 1-degree data is input to neural layer 30 in FIG. 4(c). Therefore, it is clear that neural layer 20 and 30 may be related to be the degrees of the input data. Hereinafter, a layer has a degree which is the same as that of data input thereto.

It is possible to process data by a layer with a degree which is lower than the data. However, neurons and synapses work inefficiently in this case. Accordingly, the degree of each data should as high as the data can take.

One data might be used as having multiple as degrees, in a formula (A+B)×B. One data may be input to one or more neural layers.

Figure 5:
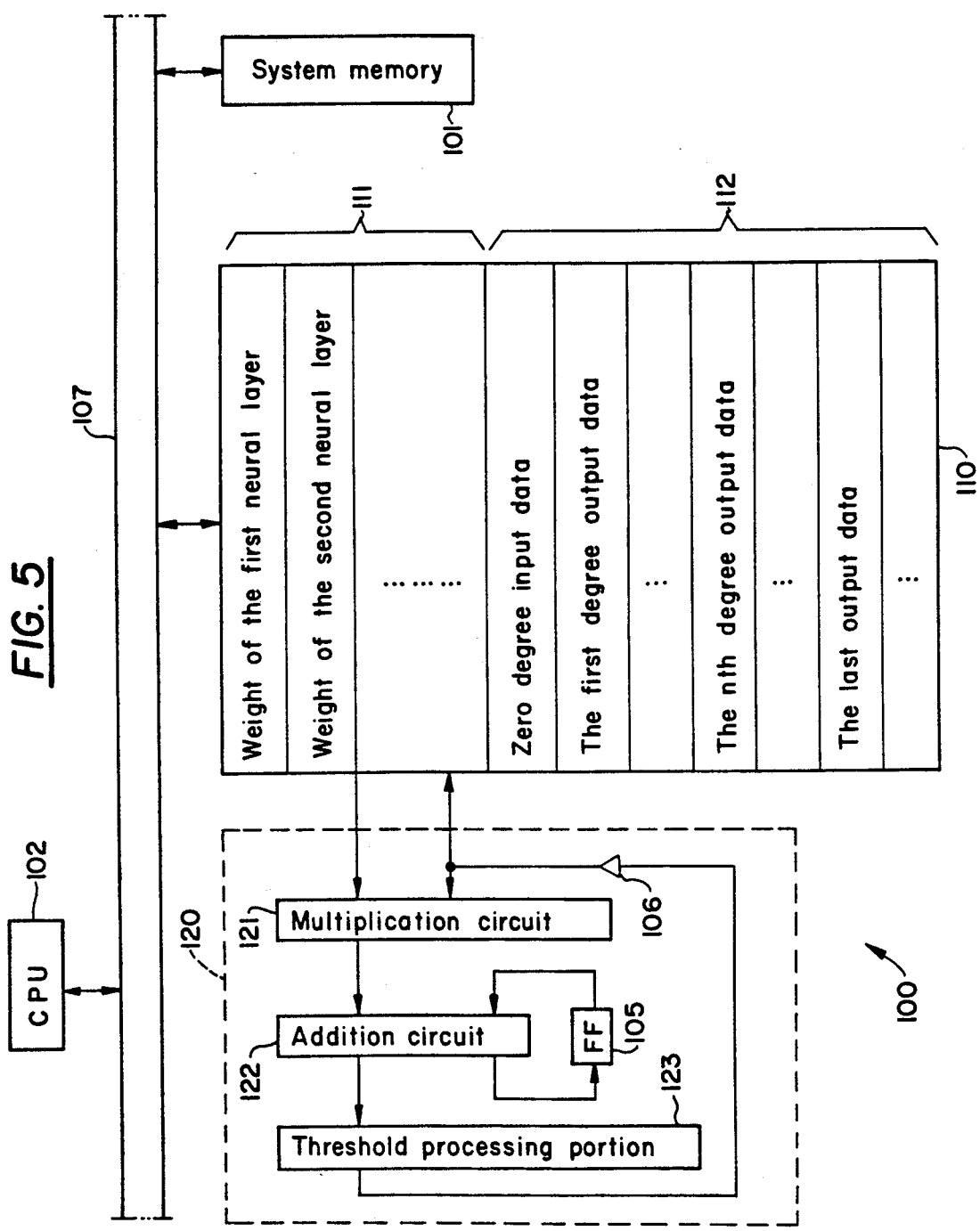
FIG. 5 shows a block diagram of a computer portion to be connected to a data processing system of the present invention.

An embodiment of a computer portion for a data processing system using the present invention is described, hereinafter. FIG. 5 shows computer portion 100 connected to an image processing system described in the U.S. patent application Ser. No. 07/141534. Computer portion 100 processes data transmitted directly or through a system bus 107 from the image processing system. The process result is output to data memory 110.

Computer portion 100 includes an output data generating portion 120 which performs associations of a neural network. The computation of a linear-threshold-function for each neuron is performed in an output data generating portion 120. Each portion in the output data generating portion 120 is controlled by CPU 120.

As mentioned above, a linear-threshold-function is a type of the formula (9). The multiplication of WiAi is executed in a multiplication circuit 121 in the output data generating portion 120. Each computation result of WiAi is input to an accumulation portion 122 where the sum and ΣWiAi is performed.

Accumulation portion 122 consists of an addition circuit 222, flip-flop 205 and a feed-back line to the addition circuit 222. Once an addition result is held in flip-flop 205, accumulation is performed by adding the next input of WIAI to the addition result held. The computation result of ΣWiAi is input to a threshold processing portion 123, which performs a computation (ΣWeAi−θ). Normalization of the computation result of (ΣWiAi−θ) is performed in the threshold processing portion 123. The final data is output from the threshold processing portion 123 through a buffer 106 to the memory 110. Multiplication circuit 121 has two input lines for receiving in parallel weight data and input or output data. Buffer 106 is connected to one of the input lines, and is used as a bidirectional line for inputting as well as outputting. Buffer 106 has high impedance when data is transmitted from data memory 110 to the multiplication circuit 121.

For the first neural layer, input data of abstraction degree of "0" as well as weights therefor are given. For the second neural layer, input data of degree of "1" and weights therefor are given. The output of the nth neural layer, that is nth output data, becomes the input of the (n+1st) neural layer. In data memory 110, weight data are stored in a synapse weight area 111 and input and output data are stored in an input and output data area 112. The threshold of each neuron in the threshold processing portion 123 is stored in data memory 110 or system memory 101 and transmitted to threshold processing portion 123 before beginning the computation of each neuron.

Figure 6:
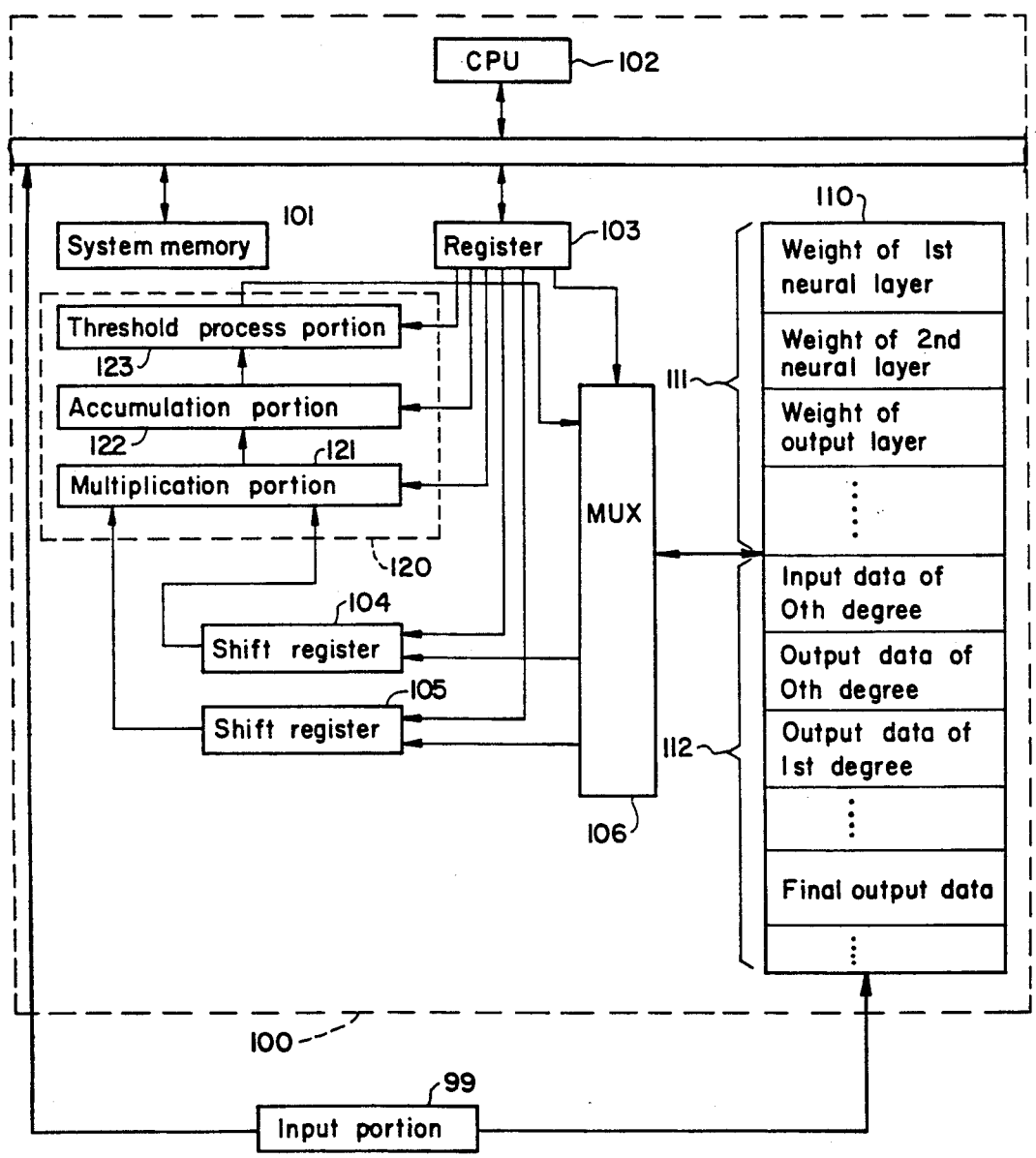
FIG. 6 shows the block diagram of another computer portion to be connected to a data processing system of the present invention.

FIG. 6 shows an alternative computer portion 100. Identical references numerals are given to portions in FIG. 6 which correspond to portions of FIG. 5. Computing portion 100 comprises a central process unit (CPU) 102, memory 110, output data generating portion 120, register 103, shift register 104, shift register 105, multiplexer 106 and system memory 101. CPU 102, system memory 101, memory 110 and register 103 are connected a bus 107. Input portion 99 is connected to memory 110 as well to bus 107. Memory 110 consists of synapse weight area 111 and input-and-output data area 112.

FIG. 6 shows an example with two neural layers as for example the network of FIG. 3B.

Input-and-output data area 112 is the area to store:

zero-degree input data to be input in the first neural layer, zero-degree output data to be output from the first neural layer, the first input data to be input to the second neural layer, the first output data to be output from the second neural layer, and the last output data to be outputted from the output layer.

Output data generating portion 120 comprises a multiplication circuit 121, an addition circuit 122 and a threshold processing circuit 123. These circuit are controlled by register 103.

Multiplication circuit 121, multiplies input data DIn and synapse weight data W. Input data DI is stored in shift register 105 after transfer through memory 110 and MUX 106. It is input to multiplication circuit 121 with predetermined timing. Synapse weight data W is transferred from memory 110 through MUX 106 to shift register 104 and stored. It is input to multiplication circuit 121 with predetermined timing.

The multiplication result of DIn×W is received at the accumulation circuit 122 from the multiplication circuit 121 for each input data DIn. Accumulation circuit 122 accumulates the multiplication results. The following computation result is stored for a synapse.

$$\Sigma(DIi \times Wi) \tag{15}$$

When the sum of weighted inputs is calculated for one synapse, the sum is input to a threshold processing circuit 123. Threshold processing circuit 123 stores the threshold θ corresponding to each neuron in the form of a table. Threshold processing circuit 123 compares the weighted sum of inputs with the threshold θ according to formula (16), and outputs the result DO.

$$DO = f\{\Sigma(DIi \times Wi) - \theta\} \tag{16}$$

In formula (16), f is defined as a binarizing function Output data Do becomes "1" when the value resulting from subtracting the threshold θ from the weighted sum is equal to or greater than 0. The output becomes "0" when the value is less than "0".

The output data DO is transmitted through MUX 106 to an input-and-output layer area 112 in control data memory 110 and stored.

Figure 7:
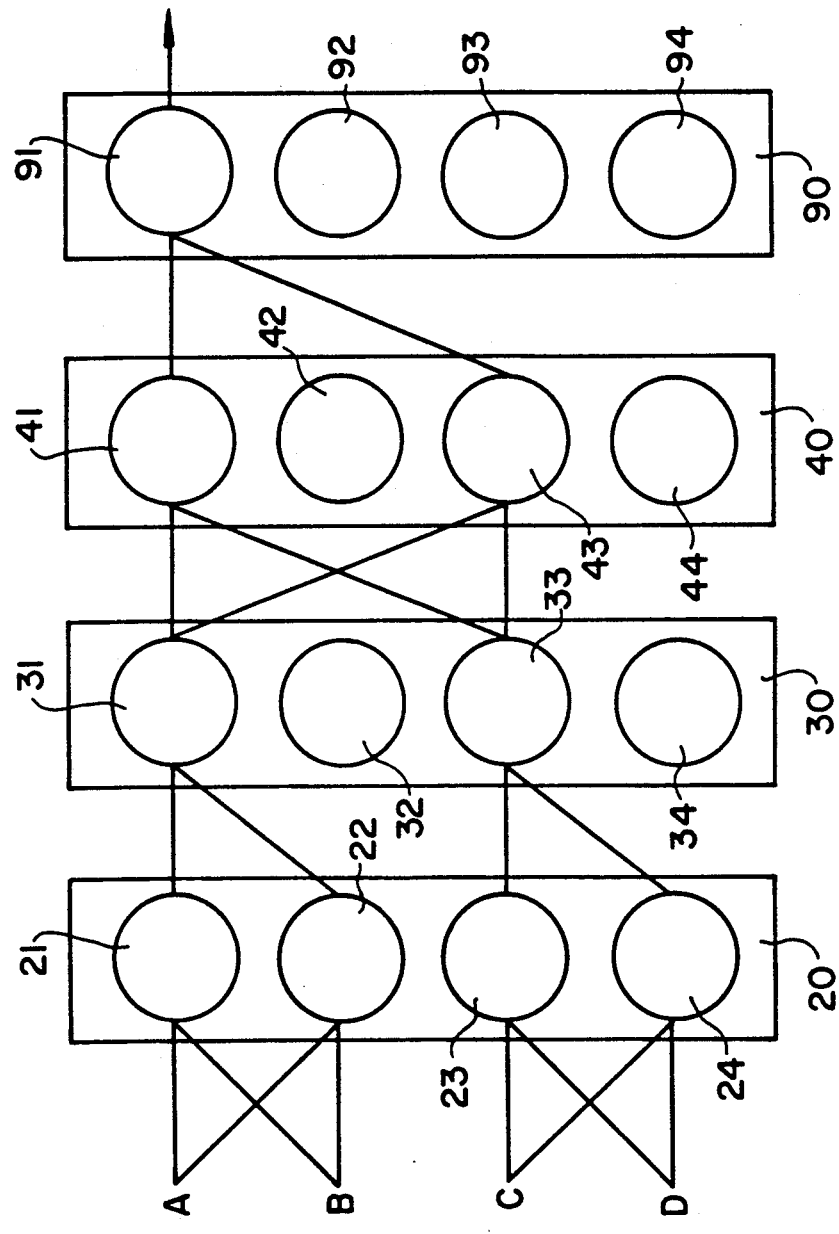
FIG. 7 shows the fifth embodiment.

FIG. 7 shows a four-layer embodiment of the present invention. It shows a case in which input data A, B, C and D are processed according to the following logic:

$$(A \oplus B) \oplus (C \oplus D) \tag{17}$$

A, B, C and D are digital values of "1" or "0", and the result of the logic computation is a digital value of "1" or "0".

$$DO = f\{\Sigma(DIi \times Wi - \theta\} \tag{16}$$

This embodiment comprises 4 neural layers 20, 30, 40 and 90. The last neural layer 90 is the output layer. The first neural layer 20 comprises 4 neurons 21, 22, 23 and 24; the second neural layer 30 comprises 4 neurons 31, 32, 33 and 34; the third neural layer 40 comprises 4 neurons of 41, 42, 43 and 44; the output layer 90 comprises 4 neurons of 91, 92, 93 and 94. Data A to D are each input to each neuron in the first neural layer 20. Each neuron is connected to each neuron in the neighbor neural layer. The lines which do not perform are omitted from the figure.

Each neuron has weights Wi by which input data are multiplied, and a threshold θ. Each neuron outputs a "1" when the weighted sum is greater than or equal to the threshold θ: it outputs a "0" when the weighted sum is less than the threshold θ (according to the formula (9) above).

For a logic computation (A⊕B) expanded as ($\overline{A}$B+A$\overline{B}$), neuron 21 processes ($\overline{A}$B) and neuron 22 processes (A$\overline{B}$) in neural layer 20. For a logic computation (C⊕D) expanded as ($\overline{C}$D+C$\overline{D}$), neuron 23 processes $\overline{C}$D and neuron 24 processes (C$\overline{D}$).

Neuron 21 outputs a "1" when the formula below is satisfied.

$$AW21 + BW22 + CW23 + DW24 = 1 \tag{18}$$

where, W21=−1, W22=1, W23=0, W24=0 and θ=1.

Neuron 22 outputs a "1" when the formula below is satisfied.

$$AW25 + BW26 + CW27 + DW28 = 1 \tag{19}$$

where, W25=1, W26=−1, W27=0, W28=0 and θ=1.

The weights Wi of neurons 23 and 24 and thresholds θ are similar to those for neurons 21 and 22.

Neuron 31 in neural layer 30 processes (AB+AB) and outputs a "1" when the formula below is satisfied:

$$KW31 + LW32 + MW33 + NW34 = 1 \quad (20)$$

where, W31=1, W32=1, W33=0, W34=0, θ=1, the outputs of neurons 21, 22, 23 and 24 are K, L, M and N respectfully.

Neuron 33 processes (CD+CD), which outputs a "1" when at least one of the outputs of neurons 23 and 24 is "1". The weights Wi of neurons 32 and 34 are 0, those neurons and to not work substantially.

Accordingly, neuron 31 outputs the result of (A⊕B) and neuron 33 outputs the result of (C⊕D).

Here, the outputs of neurons 31, 32, 33 and 34 are defined as E, F, G, and H, respectively. Neuron 41 in neural layer 40 processes (EG) and neuron 43 processes (EG). Neuron 41 outputs a "1" when the formula below is satisfied:

$$EW41 + FW42 + GW43 + HW44 = 1 \quad (21)$$

where, W41=−1, W42=0, W43=1, W44=0 and θ=1.

Likewise, neuron 43 output a "1" when the formula below is satisfied:

$$EW45 + FW46 + GW47 + HW48 = 1 \quad (22)$$

where, W45=1, W46=0, W47=1, W48=0 and θ=1.

Neurons 42 and 44, whose weights Wi are 0, do not work substantially.

Neuron 91 in the output layer 90 process ($\overline{EG}+E\overline{G}$) and outputs a "1" when the formula below is satisfied.

$$PW91 + QW92 + RW93 + SW94 = 1 \quad (23)$$

θ=1, the outputs of neurons 41, 42, 43 and 44 are P, Q, R and S respectively.

Neurons 92, 93 and 94 do not work substantially. In this way, the neurons which do not work substantially can be omitted when the network's usage is limited and the number of outputs are defined.

From the discussion above, neuron 91 outputs the result of (E⊕G), that is the result of (A⊕B)+(C⊕D).

The degree of the output data of the logic computations (A⊕B) and (C⊕D) are "2", because the operator "⊕(EX-OR)" is equivalent to two "AND" and "OR" operations. Therefore, the degree of output data is 4 for a logic computation (A⊕B) ⊕ (C⊕D). This logic computation is processed through 4 neural layers, each having as many neurons as the number of input data, that is 4.

Figure 8A:
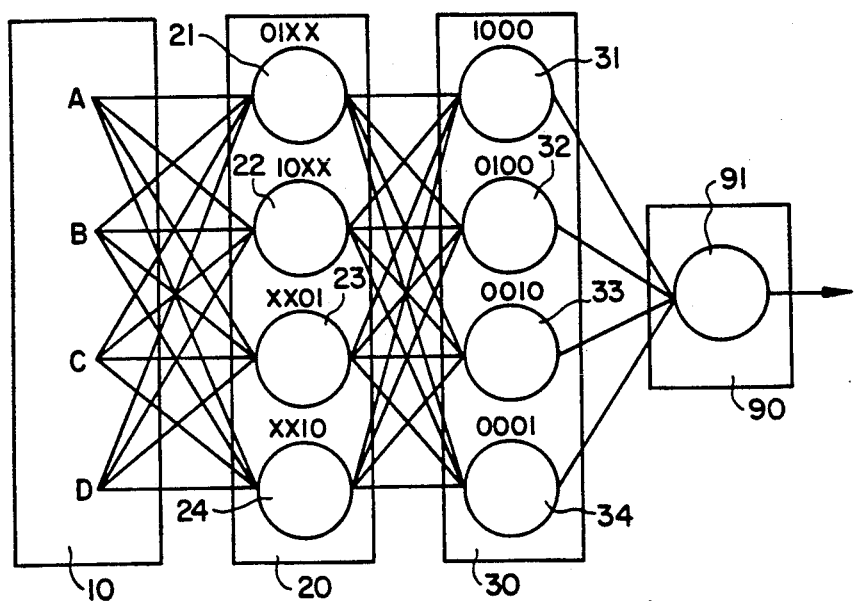
FIG. 8(a) shows the sixth embodiment.
Figure 8B:
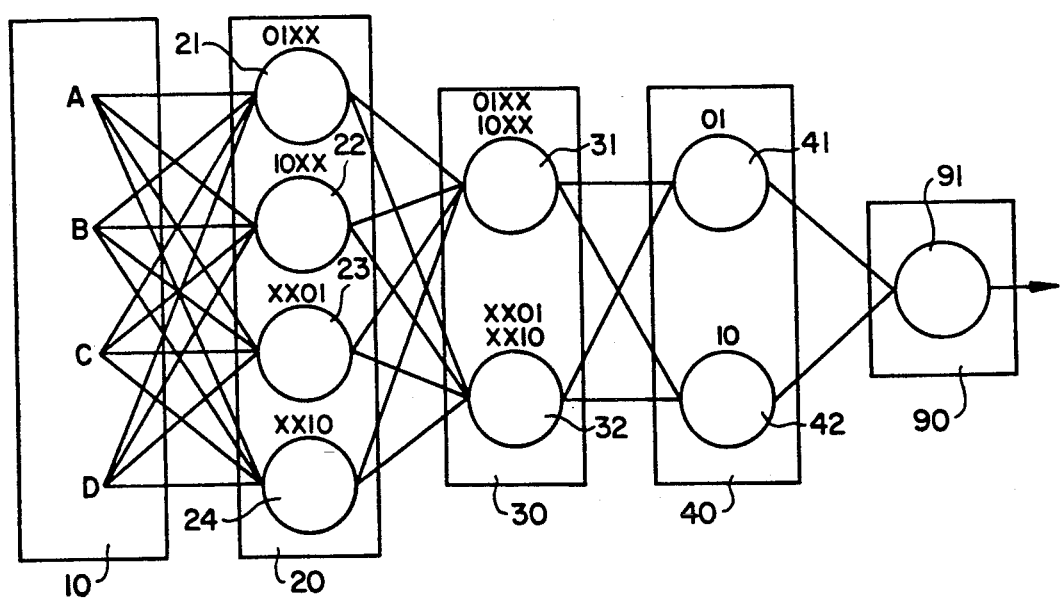
FIG. 8(b) shows the seventh embodiment.

FIG. 8(b) shows an embodiment of the invention for comparison with the network of FIG. 8(a). These networks process input data according to the computation of:

$$(A \oplus B) \oplus (C \oplus D) \quad (24)$$

where, ⊕ shows "exclusive or", A, B, C and D are the digital values of "1" or "0"; the results of this logical computation are output as digital values of "1" or "0".

FIG. 8(a) shows a comparative example, comprising a data group 10, a first neural layer 20, a second neural layer 30 and an output layer 90. Input data group 10 includes input data A, B, C and D. The first neural layer 20 comprises four neurons 21, 22, 23 and 24. The second neural layer 30 comprises four neurons 31, 32, 33 and 34. Data A to D are input to each neuron in the first neural layer 20. Each neuron of the first layer is connected to each neuron in the second neural layer 30. The output layer 90 comprises a single neuron 91, to which each neuron in the second neural layer 20 is connected.

Neuron 21 in the first neural layer 20 has weights and a threshold for the linear-threshold-function. It outputs a "1" when the weighted sum of input data equals or exceeds the threshold, and it outputs a "0" when the weighted sum is smaller than the threshold. In the same way, neurons 22, 23 and 24 output "1" or "0" in response to the input data. Each neuron in the second neural layer 30 outputs "1" or "0" in the same way as the first neural layer 20. Neuron 91 in the output layer 90 outputs "1" or "0" according to the output data from the second neural layer 30 in the same way.

The result of logical computation (A⊕B)⊕(C⊕D) is "1" when data A does not coincide with B, and C coincides with D; or when A coincides with B and C does not coincide with D. Otherwise, it becomes "0". Each neuron in FIG. 8(a) is constructed as follows.

Neuron 21, 22, 23 and 24 in the first neural layer 20 output "1" when A, B, C and D are 4 bit patterns of "01xx", "10xx", "xx01" and "xx10", respectively. They output "0" for other inputs.

Neuron 31 in the second neural layer 30 outputs "1" when only neuron 21 in the first neural layer 20 outputs "1". Otherwise, it outputs "0". Neuron 32 outputs "1" when only neuron 21 in the first neural layer 20 outputs "1". Otherwise, it outputs "0". Neuron 33 outputs "1" when only neuron 23 in the first neural layer 20 outputs "1". Neuron 34 outputs "1" when only neuron 24 in the first neural layer 20 outputs "1".

On the other hand, neuron 91 in output layer 90 outputs "1" when at least one neuron in the second neural layer 30 output(s) "1".

When the input data A, B, C and D are "0001" only neuron 23 in the first neural layer 20 outputs "1" and other neurons of 21, 22 and 24 output "0". Consequently, neuron 33 in the second neural layer outputs "1" and neuron 91 in output layer 90 outputs "1". Similarly, when a bit pattern consisting of A, B, C and D are "0111", "0100", "1000", "1110", "1101", "1011" or "0111", one of the neurons in the second neural layer outputs "1" and neuron 91 in output layer 90 output "1".

FIG. 8(b) shows an embodiment of the present invention, comprising input data group 10, a first neural layer 20, a second neural layer 30, a third neural layer 30 and an output layer 90. Input data group 10 consists of input data A, B, C and D. The first neural layer 20 comprises four neurons of 21, 22, 23 and 24. The second neural layer 30 comprises two neurons 31 and 32. The third neural layer 40 comprises two neurons 41 and 42. The output layer 90 comprises one neuron 91. Data A to D are input to the neurons in the first neural layer 20, which are connected to the neurons in the second neural layer 30. Neurons in the second neural layer 30 are connected to the neurons in the third neural layer 40, which are connected to the neuron in the output layer 90.

All neurons in neural layers 20, 30, 40 and the output layer 90 output "1" or "0" according to input data, similarly to the case in FIG. 8(a).

Neurons 21, 22, 23 and 24 in the first neural layer 20 output "1" when 4 bit pattern of A, B, C and D are "01xx", "10xx", "xx01" or "xx10". Otherwise, they output "0". Neuron 31 in the second neural layer 30 outputs "1" when a neuron 21 or 22 in the first neural layer 20 outputs "1". Otherwise, it outputs "0". Neuron 32 outputs "1" when neuron 23 or 24 in the first neural layer 20 outputs "1". Otherwise, it outputs "0". Neuron 41 in the third neural layer 40 outputs "1" when only neuron 32 in the second neural layer 20 outputs "1". Otherwise, it outputs "0". Neuron 42 outputs "1" when only neuron 31 in the second neural layer 20 outputs "1". Otherwise, it outputs "0". Neuron 91 in output layer 90 outputs "1" when at least one neuron in the third neural layer 40 output(s) "1".

When input data of A, B, C and D is a bit pattern of "0001", only neuron 23 in the first neural layer 20 outputs "1" and other neurons 21, 22 and 24 output "0". Consequently, only neuron 32 in the second neural layer 30 outputs "1" and neuron 41 in the third neural layer 40 outputs "1". Accordingly, neuron 91 in output layer 90 outputs "1". In the same way, when a bit pattern of A, B, C, and D is "0100", "0100", "1000", "1110", "1101", "1011" or "0111", one of the neurons in the second neural layer 30 outputs a "1". Consequently, one neuron in the third neural layer 40 outputs "1", thereby the neuron in the fourth neural layer 40 outputs a "1".

As seen by inspection, the four layer network of FIG. 8(b) (having a number of layers equal to the abstraction degree) is more efficient than the comparative example of FIG. 8(a). In the network of FIG. 8(a), the number of synapses is 36 and the number of neurons is 10. In the embodiment in FIG. 8(b), the number of synapses is 30 and the number of neurons is 10. When input data is processed by logical computation of $(A \oplus B) \oplus (C \oplus D)$, 36 synapses are necessary in the comparative example. Only 30 synapses are necessary in the embodiment of FIG. 8(b).

The number of synapses decreases about 20% by use of the present invention in this embodiment. The number of synapses and the capacity of memory is decreased and the speed of computation become higher by increasing number of neural layers and by setting the number of neurons in a neural layer to be less than the number of neurons in the previous neural layer.

FIG. 9(b) shows another embodiment with FIG. 9(a) showing a comparative example. This example shows input data processed by formula (25):

$$\{(A \oplus B) \oplus (C \oplus D)\} \oplus E \qquad (25)$$

FIG. 9(a) shows a comparative example. Input data group 10 comprises five data A to E. The first layer 20 comprises 15 neurons and the output layer 90 comprises one neuron. In the comparative example, each term of an expansion of formula (25) is inputted to each neuron in neural layer 20. All the data is processed as zero degree data.

FIG. 9(b) shows an embodiment of the present invention, which comprises input data 10, a first neural layer 20, a second neural layer 30, a third neural layer 40, a fourth neural layer 50 and an output layer 90. The first neural layer 20 and the second neural layer 30 perform the processes of $(A \oplus B)$ and $(C \oplus D)$. The third neural layer 40 performs a process according to $\{(A \oplus B) \oplus (C \oplus D)\}$. The final result is computed with $\{(A \oplus B) \oplus (C \oplus D)\} \oplus E$ in the fourth neural layer 50 and output layer 90.

As understood by comparison between FIG. 8(a) and (b), the number of synapses and the number of neurons in the comparative example (FIG. 9(a)) are 80 and 16, respectively. The number of synapses and the number of neurons in the embodiment of FIG. 9(b) are 32 and 10, respectively. The number of synapses decreases by 40% and the number of neurons decreases by 60% (approximately). Therefore, the same advantages in the above embodiment can be obtained in this embodiment.

As understood from the above explanation, the layer structure of the input data groups, the neural layers and output layer have to be constructed in the most appropriate way corresponding to the abstraction degree of the data process output and the degree of the input data. The input data is input to the appropriate layer according to the degree of the layer. "Degree" here means the abstraction degree of the data and of the process as stated above.

Figure 11:
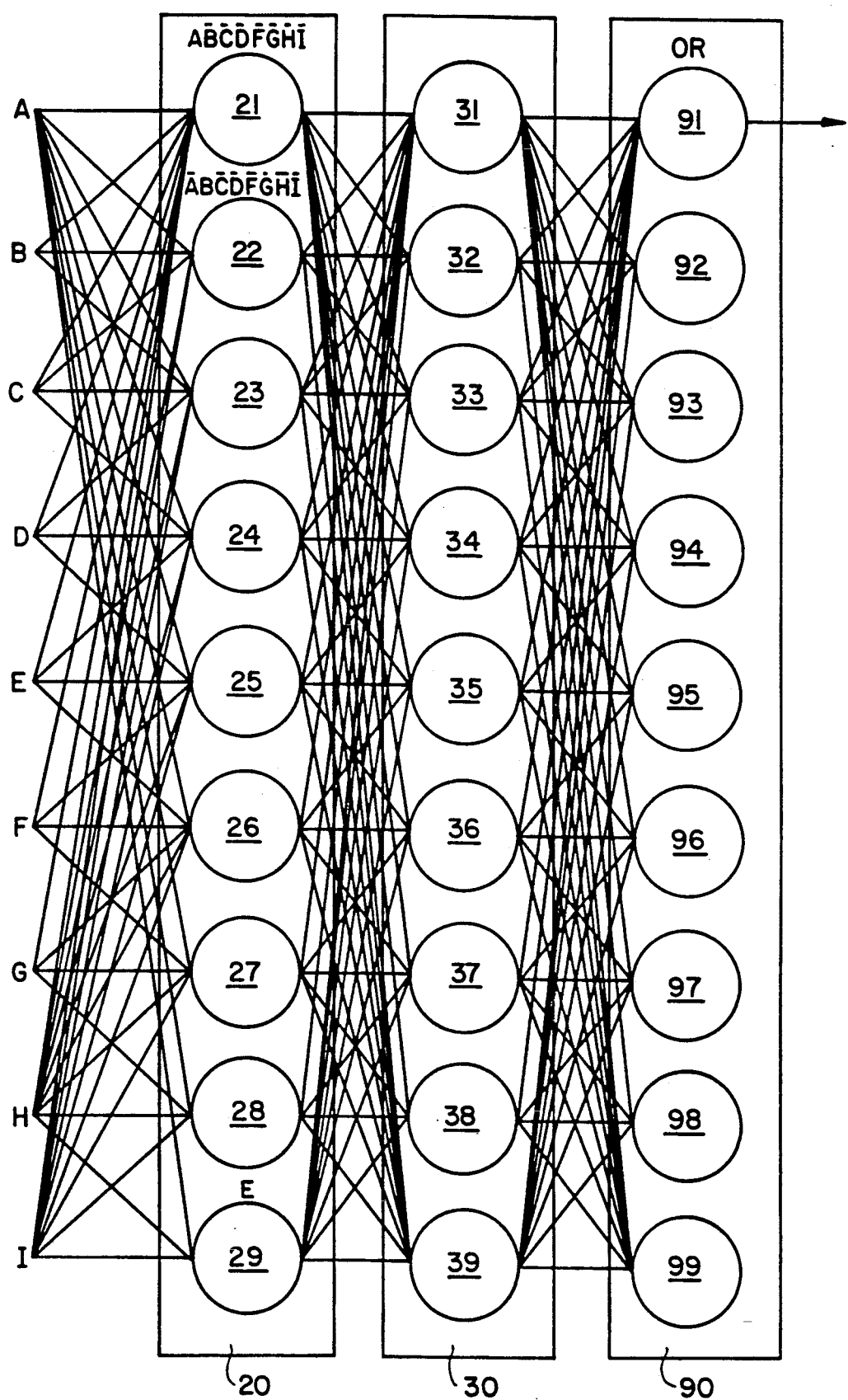
FIG. 11 shows tenth embodiment.

A data processing system for judging an end point of a configuration is shown with reference to FIG. 10 and FIG. 11.

Various manners exist to test for an end point of a configuration. In this case, in a 3×3 convolution (FIG. 10(a)), the center pixel (pixel E in FIG. 10(a)) is an end point when one of patterns from (b)(i) to (viii) is detected. When one of pixels among A to D and F to I is the density of a configuration (for example "1"), and the center pixel E is the density of a configuration, the center pixel is the "end point". Otherwise, it is "not an end point".

A data processing system for such judgment is constructed as shown in FIG. 11. This data processing system comprises a first neural layer 20 which has 9 neurons 21 to 29, a second neural layer 30 which has 9 neurons 31 to 39 and an output layer 90 which has 9 neurons 91 to 99. The pixel data from A to I are input to the first neural layer 20.

Neuron 21 in the first neural layer 20 outputs a "1" when only pixel A is "1" (among the pixels A to D and F to I). Similarly, neurons 22, 23, 24, 25, 26, 27 and 28 output an output data "1" when only one of pixels B, C, D, F, G, H and I are "1", respectively. Therefore when one of pixels from A to D and F to I is "1", one of neurons from 21 to 28 outputs an output data "1". On the other hand, neuron 20 outputs the data of pixel E.

Neuron 31 in the second neural layer 30 outputs a "1" when the outputs of neurons 21 and 29 are "1", that is, when pixels A and E are "1". Likewise, neurons from 32 to 38 output an output data "1" when pixels B and E are "1", when pixels C and E are "1", when pixels D and E are "1", when pixels F and E are "1", when pixels G and E are "1", when pixels H and E are "1" and when pixels I and E are "1", respectively. Neuron 39 does not participate in a judgment of the end point, substantially.

Neuron 91 in output layer 90 outputs a "1" when at least one of the neurons from 31 to 38 in the second neural layer 30 outputs a "1", that is when at least one of patterns in FIG. 6(b) (i) to (viii) is generated. The center pixel E is judged as an end point on this occasion. Neurons from 92 to 99 do not participate in a judgment of an end points, substantially.

When the pixel date from A to I are defined as zero degree data, the output of neuron 91 is third degree data and three steps of logic computations are constructed for judging end points. The computation is as follows. In neural layer 20, logical multiplication is performed for judging if only one of pixels A to D and F to I is "1" or not, for example (ABCDFGH) in neuron 21. In neural layer 30, logical multiplication is performed for judging if only one of pixels in A to D and F to I is "1" and E is "1" or not, for example (ABCDFGHI.E) in neuron 31. In neural layer 90, logical sum is performed for judging if E is "1" and one of pixels in A to D and F to I is "1".

The judgment of end points can be performed by a logical sum for judging if E is "1" and one of pixels in A to D and F to I is "1" in neural layer 30. Therefore, it is possible to judge end points through 2 neural layers. When the difference of degrees between output data and input data is 3, the judgment of end point can always be executed by arranging at most 3 neural layers.

Figure 12:
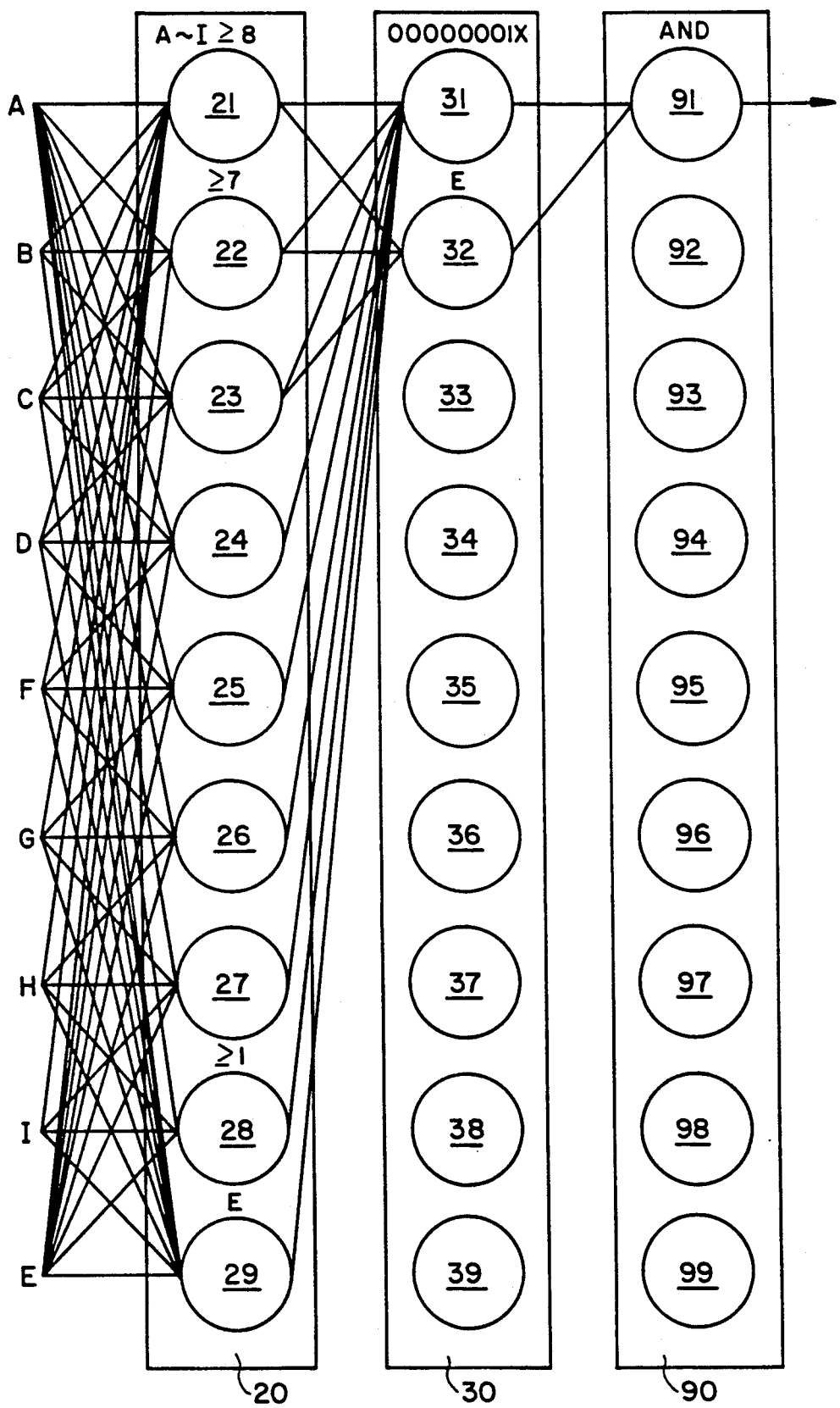
FIG. 12 shows eleventh embodiment.

FIG. 12 shows another embodiment of the present invention. The present data processing system comprises the first neural layer 20 which has 9 neurons 21 to 29, the second neural layer 30 which has 9 neurons 31 to 39 and the output layer 90 which has 9 neurons 91 to 99. The data of pixels from A to I are input to the first neural layer 20.

Neuron 21 in the first neural layer 20 outputs a "1" when 8 or more pixels from A to D and F to I are "1". Neuron 22 outputs a "1" when 7 or more pixels from A to D and F to I are "1". In the same way, neuron 23, 24, 25, 26, 27 and 28 output "1" when 6 or more, 5 or more, 4 or more, 3 or more, 2 or more and 1 or more pixels from A to D and F to I are "1", respectively. Neuron 29 outputs the data of pixel E.

Neuron 31 in the second neural layer 30 outputs an output data "1" when only neuron 28 in neurons 21 to 28 in neural layer 20 outputs "1". That is, neuron 31 outputs a "1" when only one pixel from A to D and F to I is "1". Neuron 32 outputs the data of pixel E as it is. Neurons from 33 to 39 do not participate in the judgment of the end points, substantially.

Neuron 91 in output layer 90 performs logical multiplication to test whether both neurons 31 and 32 output "1". Neuron 91 outputs a "1" when only one pixel in A to D and F to I is "1" and E is "1". Neurons from 92 to 99 do not participate in the judgment of the end points, substantially. The end point data is judged through 3 neural layers in this embodiment.

Figure 13:
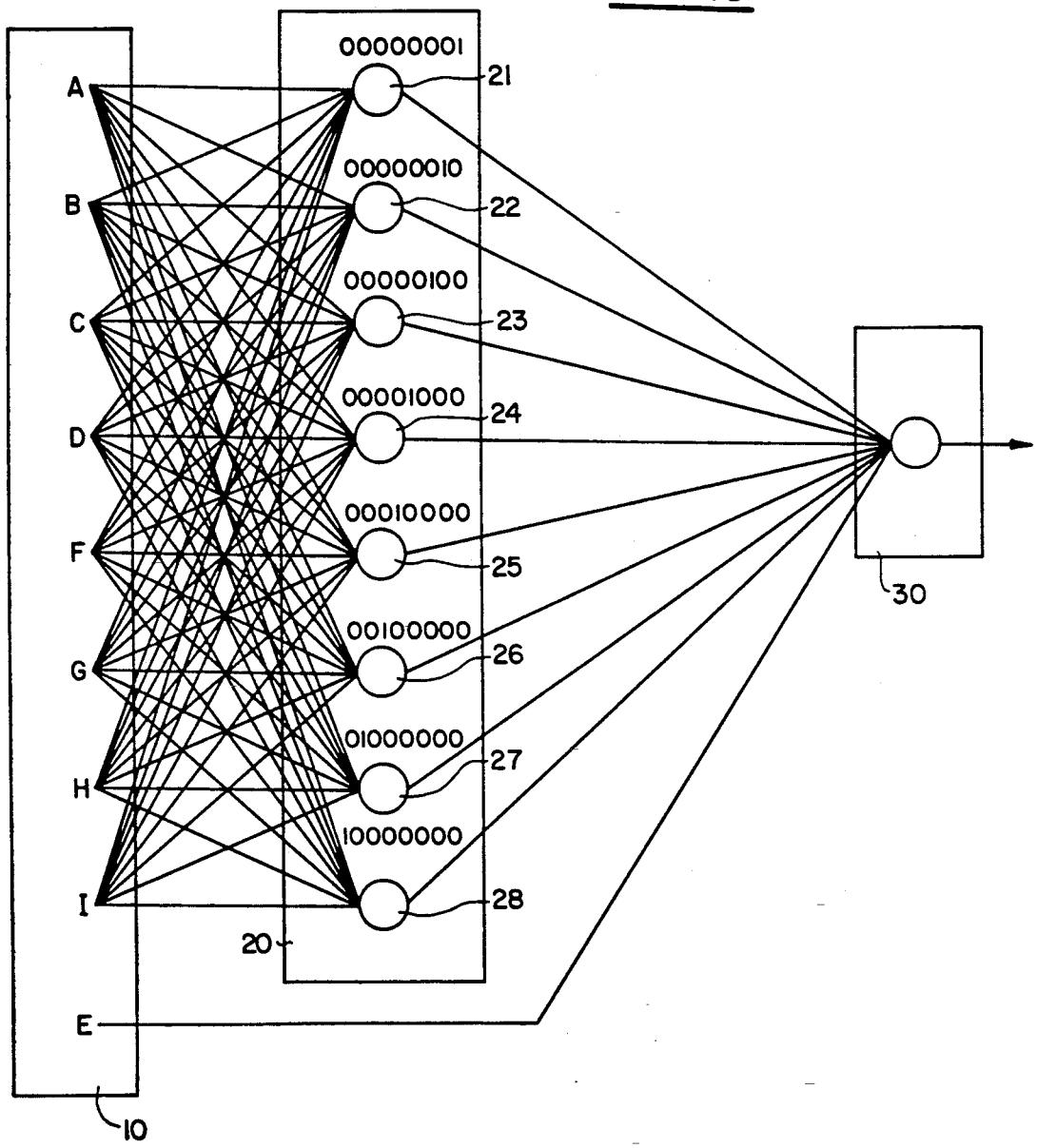
FIG. 13 shows twelfth embodiment.

An alternate data processing system for end point judgment is constructed in FIG. 13, which shows another embodiment of the present invention. This data processing system comprises a second neural layer 30 consisting of one neuron 31. The data of the pixels A to D and F to I are inputted to neural layer 30.

Neurons 21 to 28 in the first neural layer judge whether only one input pixel is "1". Neuron 31 in the second neural layer 30 outputs "1" when one of the neurons from 21 to 28 outputs "1" and E is the pixel of a configuration "1".

The output data of neuron 31 is second degree data when the data of each input pixel zero degree data. Therefore, end point data may be recognized as second degree data in the case that each pixel data is defined as the zero degree data.

Various data is output from an image processing system, such as the number of groups, the number of holes, Euler number, the characteristics value, and so on. Considering the degrees of these data, they may be input directly to the most appropriate neural layer.

Figure 14A:
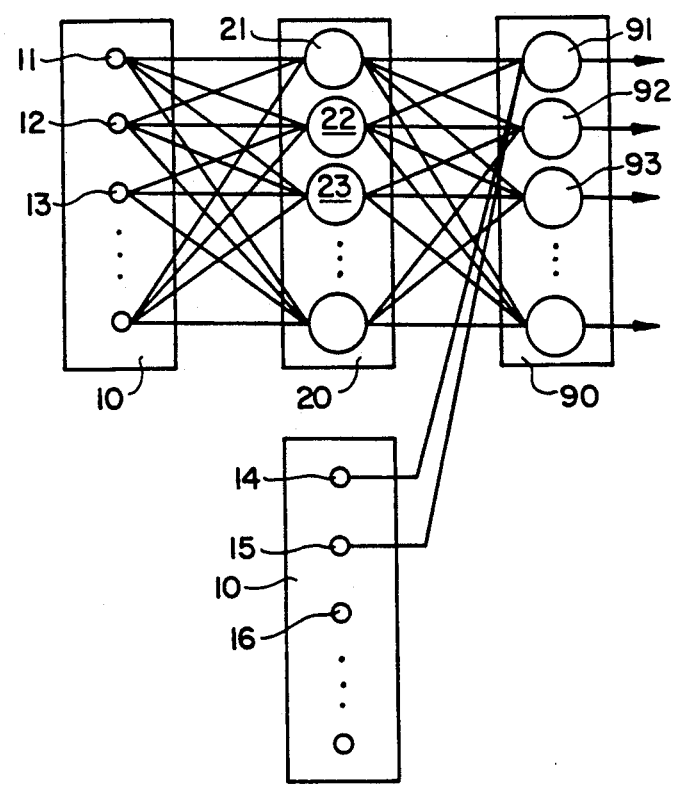
FIG. 14(a) shows thirteenth embodiment.

FIG. 14(a) shows another embodiment of the present invention. The data processing system in this embodiment comprises data group 10 and neural layers 20 and 90. Neural layer 90 is an output layer to an outside data processing system Data group 10 comprises data 11, 12, 13 . . . in a first group and data 14, 15, 16 . . . in a second group. The data in data group 10 is classified into two groups, first and second, according to the degrees thereof.

Neural layer 20 comprises neurons 21, 22, 23 . . . . Output layer 90 comprises neurons 91, 92, 93 . . . . Each neuron in neural layer 20 is connected to each neuron of output layer 90. Data 11, 12, 13 . . . in the first group are input to each neuron in the first neural layer 20. Data 14, 15, 16 . . . in the second group are input to each neuron in the output layer 90.

Each neuron in neural layer 20 compares a weighted sum of input data with a threshold so as to generate an output "1" or "0" according to the comparison result as shown in formula (9). Each neuron in the output layer 90 calculates the weighted sum of outputs from neurons in the first neural layer 20 and data 14, 15, 16 . . . from the second group. It outputs a "1" or "0" according to the comparison result between the weighted sum and a threshold in the same way as neurons in neural layer 20.

Data 11, 12, 13 . . . in the first group is, zero-degree data indicating whether a pixel is "1" (black, for instance) "0" (white, for instance). Data 14, 15, 16 . . . in the second group are data of higher degree indicating characteristics of an image.

In the embodiment of FIG. 14(a), the data in the first group—that is the data of lower degree—is input to the neurons in neural layer 20. The data in the second group—that is the data of higher degree—is input to the neurons in output layer 90. Accordingly, the neurons in neural layer 20 perform lower order processing, that is the processing on the data of a pixel itself. The neurons in output layer 90 perform processing of higher degree, that is the processing on various characteristics of a pixel.

In this embodiment, the number of the synapses and neurons decreases. That is why the data of higher degree is input directly to output layer 90, and is not input to neural layer 20. When the number of synapses decreases, the memory capacity decreases, (because the number of computations decreases) the computation speed becomes higher and the amount of weight data decreases. It is possible to process images using a memory with small a capacity at high speed in the present embodiment. An efficient data processing system with simple circuit results.

Figure 14B:
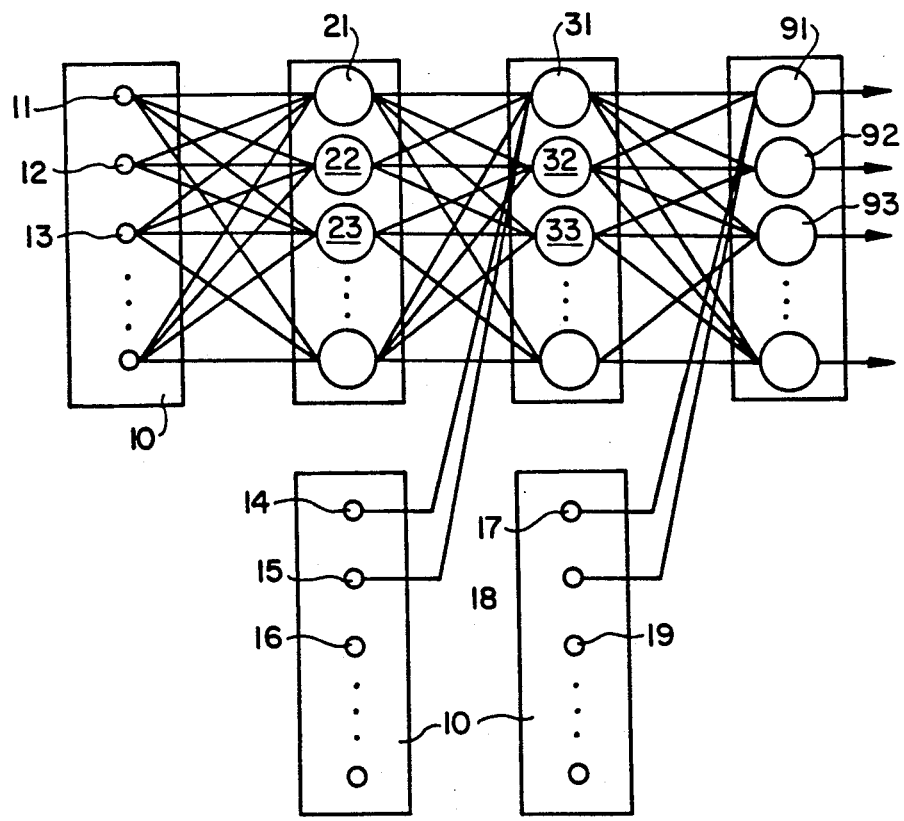
FIG. 14(b) shows fourteenth embodiment.

FIG. 14(b) shows another embodiment of the present invention. The data processing system in the embodiment comprises three input data groups 10, neural layers 20, 30 and output layer 90.

Input data group 10 comprises data 11, 12, 13 . . . in the first group, 14, 15, 16 . . . in the second group and 17, 18, 19 in the third group. Input data groups are classified into three kinds. The first neural layer 20 comprises neuron 21, 22, 23 . . . and the second neural layer 30 comprises neurons 31, 32, 33 . . . . Output layer 90 comprises neurons 91, 92, 93 . . . . Each neuron in the first neural layer 20 is connected to each neuron in the second neural layer 30, and each neuron of the second layer is connected to each neuron in the output layer 90. Each neuron outputs a "1" or "0" in response to input data according to the formula (9).

The data 11, 12, 13 . . . are each connected to each neuron in the first neural layer 20. The data of the second group 14, 15, 16 . . . are connected to neurons in the second neural layer 30. The data of the third group 17, 18, 19 ... are connected to neurons in the output layer 90.

The data 11, 12, 13 ... in the first group are zero degree data. The data 14, 15, 16 ... in the second group are first degree data. The data 17, 18, 19 ... in the third group are second degree data. The data of first degree is input to the intermediate (second) neural layer 30 and the data of higher degree is inputted to the higher (output) layer 90.

In the embodiment above, the degree of data is the number of processes (logical combination) executed on the data: each process is executed in a neural layer. For instance, pixel data is zero degree, end points data is the third degree and the difference between these degrees is 3. The expected process can be performed by 3 neural layers. Processes include "AND", "OR", "NAND" and "NOR". "EX-OR", "EX-NOR" and other operations have to be transformed and "AND" OR "OR", because "EX-OR" and so on cannot be processed by one neural layer.

Weights have to be settled (adapted) through suitable values through learning before performing the above processes. Therefore, in the present embodiment, the weights are changed over time so as to follow an exponential function as described below. There are three methods roughly classified and described in the U.S. patent application Ser. No. 07/295,763. They are called here Mode I, Mode II and Mode III.

In Mode I, the weights of neurons are corrected according to the outputs of the neurons. This method for correction is effective when the objective value of the outputs of each layer is known. When a neuron generates an output corresponding to an input and when the output is coincident with or near the objective value, the relationship between the input and output is reinforced. This is equivalent to weight enhancement of the synapse. In Mode I, since the objective value of the output of each neuron is known, the output of each neuron and the objective value can be compared with each other. When both of them coincide (or near enough) the weight of a synapse which receive a "1" input is enhanced (for binary inputs).

Figure 15:
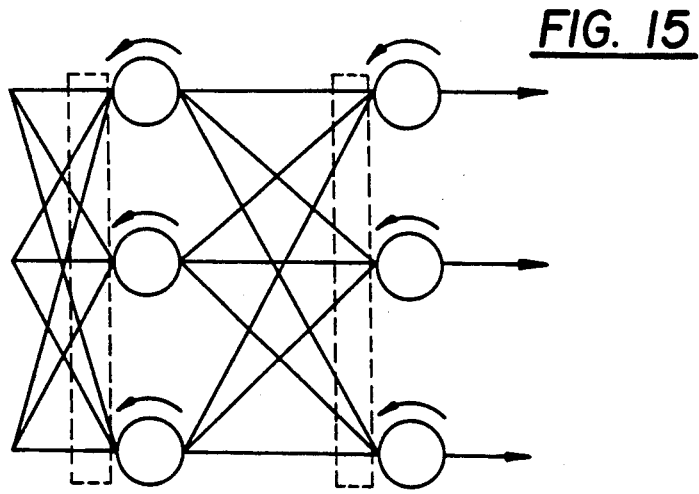
FIG. 15 shows a diagram of data processing system for learning Mode I.

Mode II is shown in FIG. 15. The weight of a neuron is corrected according to the last output evaluation. Hamming distance between the last output of the output layer and the objective value, or evaluation of a Pythagorean distance may be used for correction with Mode II. When the output is coincident with (or near enough to) the objective value on the evaluation, the relationship between the input and output is reinforced. At that time, the weight of each synapse receiving a "1", for example, is increased.

Figure 16:
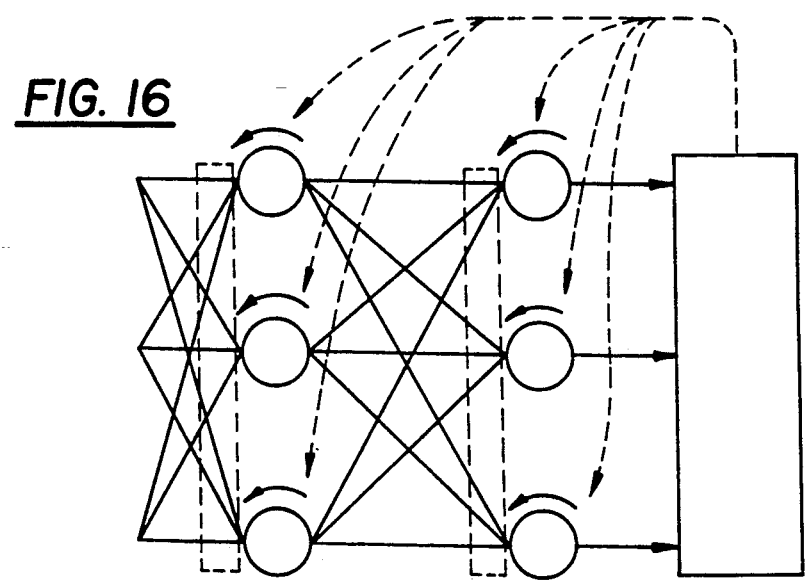
FIG. 16 shows a diagram of a data processing system for learning Mode II.

Mode III is a method to correct weight in the case of memorizing inputs. The relationship between an input and the output generated first on the input is reinforced. That is, in the structure in FIG. 16, the weight of a synapse of a neuron receiving a "1" and outputting "1" is increased.

Figure 17:
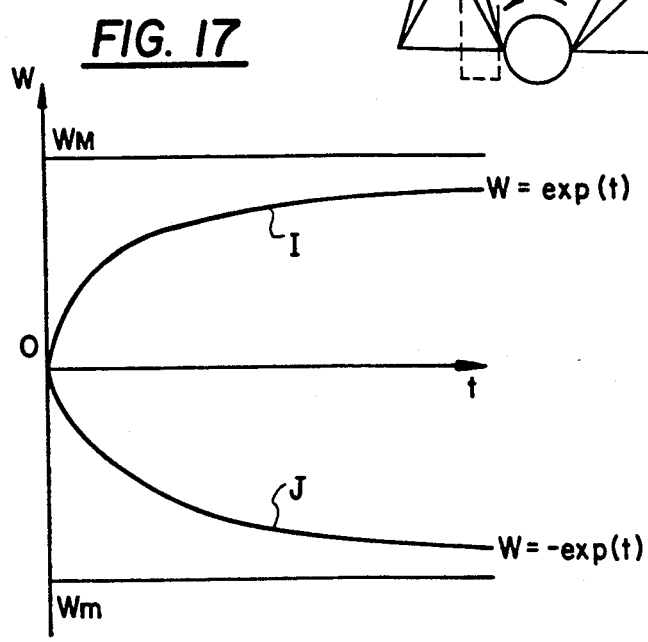
FIG. 17 shows a diagram of the weight change along learning times.

The weight of a neuron is similar to the change of electrical potential of a membrane of a neural cell of an organism. Learning in data processing system becomes efficient when the weight is adjusted similarly to the electrical potential of membrane of neural cell of an organism. The weight may be expressed as an exponential function, similar to an RLC circuit, when the weight changes in the same way as an electrical potential of a membrane. The weight W is expressed by the formula (9) as shown in FIG. 17.

$$W = + - exp(t) \qquad (9)$$

where, t is the learning time of each neuron.

In the formula (9), when a synapse is stimulated, the sign is +. As shown with the solid line I, weight W, starting from 0, becomes larger rapidly at first. As time passes the change of weight becomes smaller and the weight converges to a minimum Wm.

Since there is little data correlation for a synapse just after learning starts, the weight W is small. Since the data correlation become closer over time the weight W become larger promptly. When weight W is already big after learning, the synapse has a strong data correlation. If the weight is changed frequently, convergence by learning is blocked because of vibrations. When weight W changes little, enough convergence has occurred.

Conventionally, neurons have been characterized as stimulated neurons and inhibited neurons. It has been difficult to combine an inhibited neuron and a stimulated one in a data processing system. The present embodiment makes it possible to realize both inhibited and stimulated synapses by selecting the sign of a weight W of a synapse's characteristic. Accordingly, the circuit has a similar structure and higher flexibility. Data separation is improved by the existence of an inhibited neuron, as mentioned by Rosenblatt. ("The Perception: A probabilistic model for information storage and organization in the brain", Psychological Review 65, pp. 386-408, 1958).

The efficiency of learning in a data processing system improves by use of the present invention, therefore, the network response converges and stabilizes quickly. As mentioned above, the characteristics of neurons (inhibited or stimulated) is selected by changing the sgn (plus or minus) of a weight W. Accordingly, the data processing system obtains flexibility in implementation.

The change of weight W over time need not be expressed as a exponential function. It may be approximated by a polygonal line.

The network processes are not only those expressed by logical computation elements, but also those to which the network adapts according to the characteristics of output data.

As mentioned above, the data processing system can be constructed knowing that it can execute the desired process.

As mentioned above, the number of synapses or neurons necessary to perform a certain process can be decreased by use of the present invention. Accordingly, it is possible to decrease the memory capacity of a data processing system and to improve the processing speed. Learning similar to that of organisms can be realized, and learning can progress efficiently.

What is claimed is:

1. A network for detecting a pattern of image pixel densities comprising:
   i) a first layer of neurons receiving image pixel densities as input signals, each neuron of the first layer comprising an electronic apparatus producing an affirmative output signal when a sum of input signals exceeds a threshold;
   ii) a second layer of neurons receiving outputs from neurons of the first neural layer as inputs, each neuron of the second layer comprising an electronic apparatus producing an affirmative output signal when a sum of adaptably weighted input signals exceeds a threshold; and iii) at least one subsequent layer of neurons receiving outputs from neurons of a preceding layer as inputs, each neuron of each subsequent layer comprising an electronic apparatus producing an affirmative output signal when a sum of adaptably weighted input signals exceeds a threshold;

wherein the number of layers equals an abstraction degree of the pattern of image pixel densities, when:

the pattern of image pixel densities is characterized as terms of pixel values combined by operations including AND, OR and equivalents thereof;

a combination of pixel values by AND and OR operations is characterized as an intermediate term having an abstraction level of one;

the combination of first and second intermediate terms by AND and OR operations is characterized as a third intermediate term having an abstraction level which is one greater than the highest abstraction level of the first and second intermediate terms; and the abstraction level of the pattern of pixel densities is the abstraction level of a term characterizing the pattern.

2. A network as in claim 1, wherein each of said neural layers comprises a number of neurons less than that of the previous neural layer.

3. A network as in claim 1 wherein a neuron comprises:

memory means for storing input signal values, output signal values, weight values, output values, and threshold values; and weight adaptation means for comparing a reference neuron output signal and a neuron output signal produced in response to training input signals, and for varying said weight values in response to said reference and produced neuron output signals.

* * * * *